Oct. 31, 1961    H. J. CROMWELL    3,006,221
DYNAMOELECTRIC UNIT DRIVE
Filed Sept. 16, 1957    2 Sheets-Sheet 1

INVENTOR.
HAROLD J. CROMWELL
BY John T. Marvin
ATTORNEY

Oct. 31, 1961 H. J. CROMWELL 3,006,221
DYNAMOELECTRIC UNIT DRIVE
Filed Sept. 16, 1957 2 Sheets-Sheet 2

INVENTOR.
HAROLD J. CROMWELL
BY John T. Marvin
ATTORNEY

United States Patent Office 3,006,221
Patented Oct. 31, 1961

3,006,221
DYNAMOELECTRIC UNIT DRIVE
Harold J. Cromwell, Anderson, Ind., assignor to General Motors Corporation, Detroit, Mich., a corporation of Delaware
Filed Sept. 16, 1957, Ser. No. 684,037
8 Claims. (Cl. 74—810)

This invention relates to drives for dynamoelectric units and is more particularly concerned with an arrangement whereby a single dynamoelectric unit is connected with an internal combustion engine to act as a starting motor to crank the engine and to be driven as a current generator by the engine after the engine has become self-operative.

The use of compact low horsepower internal combustion engines is constantly increasing. This increase can largely be attributed to the public acceptance of power lawn mowers, garden tractors and small stationary power plants. The engines for these units are usually hand-cranked by means of a rope starter and are provided with magneto ignition systems. The present invention is directed to the use of a unit which will have a dual function. That is, it will supply the necessary torque to crank the engine and will generate current to charge a storage battery. This will permit an automotive type ignition system to be used on the small engines and headlamps and other electrical current consuming devices to be used with the tractor or lawn mower as well as provide the conveniences of electric starting.

In view of the low cost of the present day low horsepower engine, it is important that the starting and current generating systems likewise be low in cost, simple, reliable, compact and provide the torque necessary to accomplish the engine cranking. In order to accomplish these objectives, my invention includes the use of a two-speed pulley which will automatically change its diameter depending on whether the unit is acting as a cranking motor or a current generator, and a mounting arrangement which will cause the belt to be tightened when the unit is operating as a starting motor and will aid the movement of the pulley parts to the two positions. Stops are provided to limit the movement of the parts of the pulley and prevent the binding thereof.

Another feature of the invention is to use the two-speed pulley on a threaded motor-generator shaft to realize economies in manufacture, and, if desired, the pulley may be formed so that two pulley halves are automatically movable between two positions so that a constant belt alignment may be maintained.

It is an object, therefore, of the present invention to provide a simple, economical current generating and starting system for internal combustion engines.

A further object of the present invention is to combine the starting motor and current generator for an internal combustion engine into a single dynamoelectric unit and to belt-connect the unit through a pulley which will automatically vary its diameter whenever the unit changes from a driving to a driven member and vice versa.

In carrying out the above objects, it is a further object to combine a mounting arrangement for the motor-generator unit with the variable diameter pulley so the reactive torque generated in the unit during cranking periods will aid the pulley in changing its diameter and will aid in tightening the belt when the unit acts as a starter.

A still further object of the present invention is to limit the range of movement and prevent binding between the movable and immovable parts of the pulley as set forth in the above objects.

A further object of the present invention is to mount the movable half of the pulley as used in the present invention on threads which are integrally formed on the dynamoelectric unit shaft so as to realize certain economies in manufacture.

A further object of the present invention is to utilize a two-speed pulley which will constantly maintain a belt alignment in a starting and current generating system for an internal combustion engine.

Further objects and advantages of the present invention will be apparent from the following description, reference being had to the accompanying drawings wherein preferred embodiments of the present invention are clearly shown.

Figure 1:
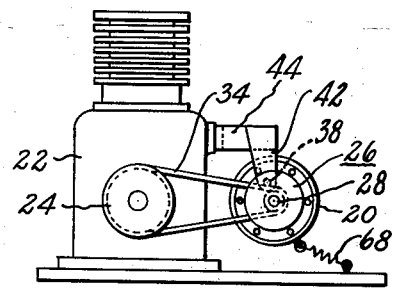
FIGURE 1 is an elevational view showing the starting and current generating system according to the present invention when the dynamoelectric unit is operating as an engine starter.

In the drawings, the dynamoelectric unit 20 is wound, as well known to those skilled in the art, to act both as a starting motor and a current generating device. When unit 20 is acting as a motor, it will provide the cranking torque for the internal combustion engine 22 and, after the engine 22 becomes self-operative, the unit 20 will be driven thereby and act as a current producing device in a manner which will become hereinafter apparent.

Figure 5:
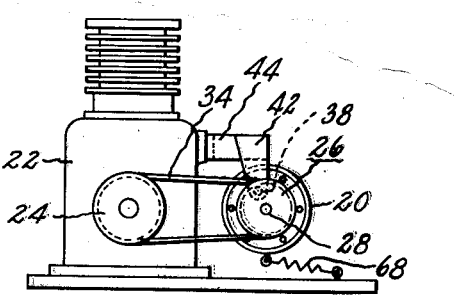
FIGURE 5 is a view similar to FIGURE 1 showing the position of the dynamoelectric unit when the unit is operating as a current generator.

The engine 22 has a pulley 24 secured to its crankshaft. The dynamoelectric unit 20 has a pulley 26, which will be hereinafter described, carried on its shaft 28. The shaft 28 is suitably journalled by means of bearings in the end frames 32 and 36. The pulleys 24 and 26 are interconnected by belt 34. Each of the end frames 32 and 36 are provided with bosses 38 and 40 respectively. The bosses 38 and 40 are located on a center line parallel to, but spaced from, the center line of shaft 28. A mounting bracket 44 has a pair of spaced arms 42, partly shown in FIGURE 2, which have openings therein to receive the bosses 38 and 40. The center portion of the mounting bracket, not shown, which connects the arms 42 is secured to a bracket 44 which is mounted in position on the engine 22 as shown in FIGURES 1 and 5. The mounting bracket 44, when thus arranged, will permit the motor-generator to be free to rotate a limited amount about a center line through the bosses 38 and 40.

Figure 2:
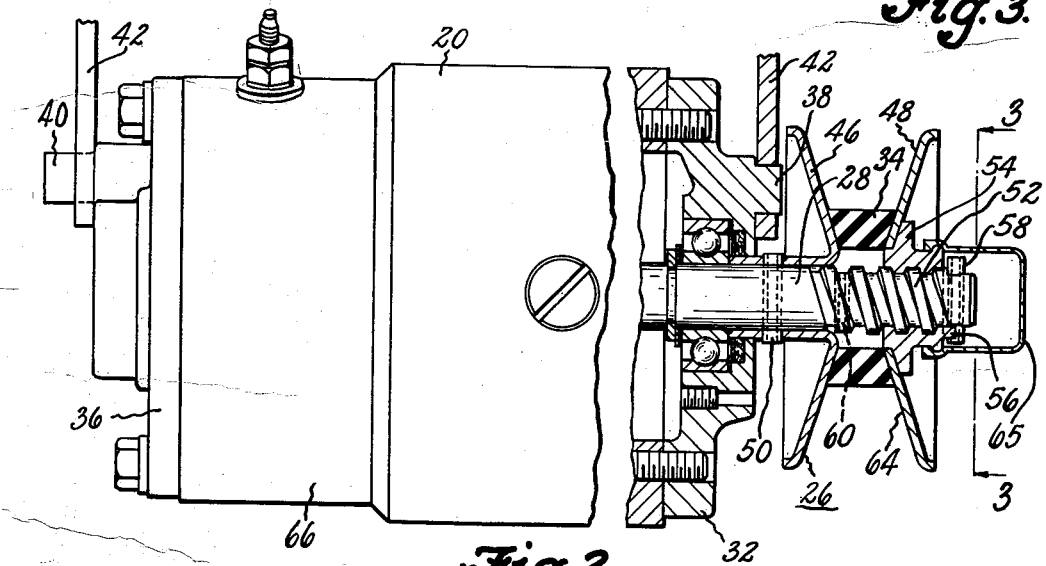
FIGURE 2 is a view, partly in section, of a typical dynamoelectric unit as used in FIGURE 1 including a variable diameter pulley and the mounting arrangement for the unit.
Figure 9:
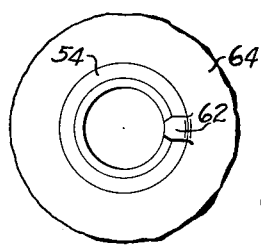
FIGURE 9 is a fragmentary end view of one of the pulleys shown in FIGURE 4.

The pulley 26 is formed of two halves 46 and 48. The puley half 46, as shown in FIGURE 2, is immovably secured to the shaft 28 by means of the pin 50. The pulley half 48 is secured to a threaded hub portion 54 which threadedly engages the threaded portion 52 of the shaft 28. In the embodiment shown, the shaft 28 has a right-hand threaded portion. From the above, it is apparent that when the hub portion 54 of pulley half 48 is rotated relative to the shaft 28, the pulley half 48 will move axially on the shaft and the direction of rotation of the hub portion 54 will determine whether or not the pulley half 48 moves toward or away from pulley half 46. The hub portion 54 is provided with extending lug 56. This lug will engage the pin 58 which is preferably press-fitted into a bore formed on the end of shaft 28. When the lug 56 engages the pin 58, further movement to the right of the pulley half 48 is prevented without binding of the various parts so that the pulley half 48 will be free to move when the relative rotation between the hub portion 54 and shaft 28 is such as will cause the pulley half 48 to move to the left. The movement to the left of the pulley half 48 is limited by a pin 60 and a lug 62 which is formed on the belt engaging portion 64 of the pulley half 48. This lug 62 extends through a notch in the hub portion 54 as is illustrated in FIGURE 9, and is arranged to engage a stop pin which is preferably formed as a press fit pin 60 which is received in a bore in the shaft 28. It is apparent from the drawings that one side edge of the lug 62 will engage pin 60 when hub 54 is moving toward pulley 46 to thereby prevent further movement of pulley 48 toward pulley 46. The pin 60 is sized so that its end surfaces will not project beyond the top of the teeth which form the threaded portion 52. This is most clearly shown in FIGURE 2. The stop pin 60 and the lug 62 will prevent the pulley halves 46 and 48 from moving into binding engagement with one another. The pulley half 48 also has a dust cover 65 secured thereto. This dust cover preferably consists of an elastomeric or rubber part which will shield the threaded portion 52 of the shaft from the entrance of dust and other foreign matters.

Figure 3:
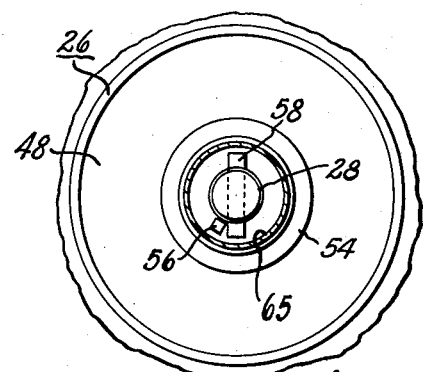
FIGURE 3 is a view taken along line 3—3 in FIGURE 2.

When the unit 20 is energized to act as a motor through a circuit which will be hereinafter explained, the armature of unit 20 will rotate the shaft 28 clockwise as shown in FIGURE 3. If it be assumed that the pulley halves are in the position shown in FIGURE 4, upon the initial rotation of the shaft 28, because of the right-hand threads on the shaft 28, the pulley half 48 will not exert any force on the belt 34 until the pulley half 48 has moved axially along the shaft 28 to the right to the position shown in FIGURE 2 where the lug 56 moves into engagement with pin 58. When the pulley half 48 is in this position, the belt 34 will ride very deeply in its V-shaped groove of the pulley and the pulley is in its cranking position wherein its effective diameter is a minimum.

When the unit 20 acts as a starting motor, the starting torque impressed in a clockwise direction on the shaft will be accompanied by an equal and opposite torque which is exerted in a counterclockwise direction on the frame and field assembly 66. This counterclockwise torque will urge the end frames 32 and 36 to likewise move in a counterclockwise direction about the mounting bosses 38 and 40. This counterclockwise force, with the assistance of the tension spring 68 which is connected as shown between the frame of the dynamoelectric unit and the base for the engine, will cause the belt 34 to be tightened during the cranking periods.

After the engine has become self-operative, it will rotate pulley 24 in a clockwise direction. The driving force on pulley 24 will be transmitted through the belt 34 to rotate the pulley 26 in a clockwise direction. Since pulley half 48 is not secured to the shaft, it will tend to over-run the shaft and thus be moved to the left on shaft 28 from the position shown in FIGURE 2 to the position shown in FIGURE 4 so that the effective diameter of the pulley will be considerably increased. The movement to the left of the pulley half is, of course, limited by the pin 60 and the lug 62.

Figure 4:
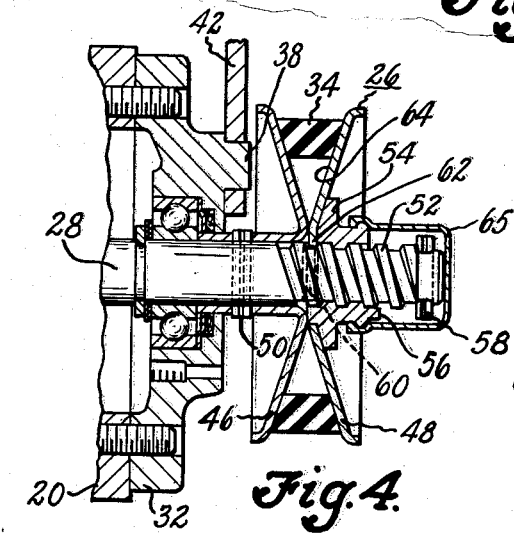
FIGURE 4 is a view showing the parts of the pulley in FIGURE 2 as moved to a second position.

During the period when pulley half 48 moves to the position shown in FIGURE 4, the effective reactive torque, which operated on the motor frame during the periods when it was used as a starting motor, is reversed and the only force which maintains the belt tight will be the force of the spring 68. This will assist in maintaining proper belt tension when the unit is acting as a generator.

Figure 6:
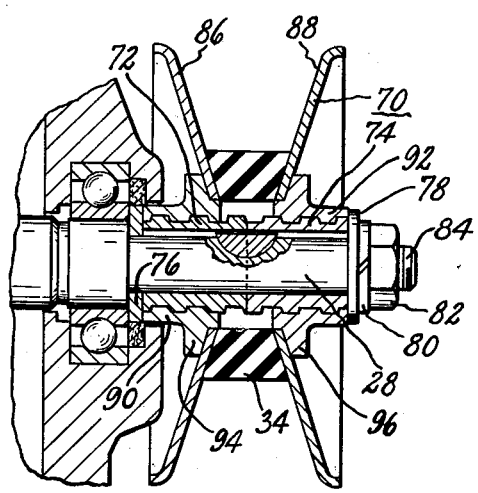
FIGURES 6 and 7 show two positions of a modified form of pulley in FIGURE 2.
Figure 7:
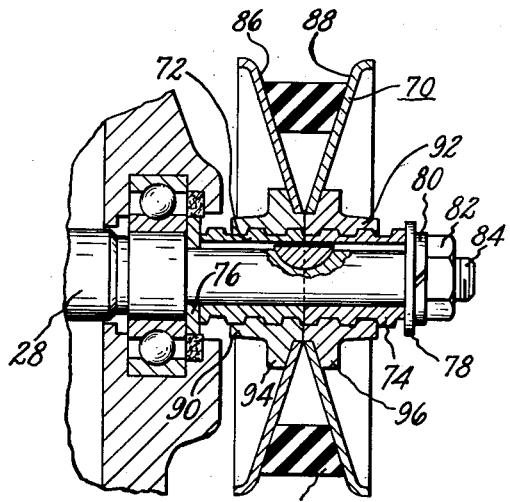

In FIGURES 6 and 7 of the drawings, a modified form of the pulley shown in FIGURE 2 is shown. In this embodiment, the pulley arrangement 70 consists of two sleeves 72 and 74 which are keyed or suitably secured to the armature shaft 28. Each of these sleeves has external spiral threads thereon. The thread on the sleeve 72 is left-handed and the thread on sleeve 74 is right-handed. The sleeves 72 and 74 are clamped end to end on the shaft 28 between the collar 76 and the washer 78 which is held in position by means of the lock washer 80 and nut 82 which engages the threaded end portion 84 on the end of the shaft 28. The pulley assembly 70 also includes two flanges assemblies 86 and 88. These flange assemblies each consist of the threaded hubs 90 and 92 which are suitably secured to the flange portions 94 and 96. The portions 90 and 92 are internally threaded to cooperate with the external threads on the sleeves 72 and 74 respectively. As in the previous embodiment, when the unit 20 is operated as a starting motor to drive the pulley in a clockwise direction, the shaft 28 will tend to rotate clockwise relative to the sleeves 90 and 92. This will cause the pulley halves to separate as shown in FIGURE 6. After the engine becomes self-operative, the belt 34 will tend to drive both pulley halves faster than the shaft 28, causing them to move toward each other and increase the effective diameter of the pulley as shown in FIGURE 7. The advantage of the modifications shown in FIGURE 6 resides in the fact that it will maintain constant alignment between the pulley on the engine and the pulley on the unit whether the unit is operating as a starting motor or as a generator. In the modification shown in FIGURE 2, it is to be noted that the parts should be arranged so that the belts are in alignment when the units are operating as a current generator. The slight misalignment which occurs during starting periods will not appreciably decrease the life of belt 34 as a unit 20 operates a far greater percentage of the time as a current generator than as a starting unit.

Figure 8:
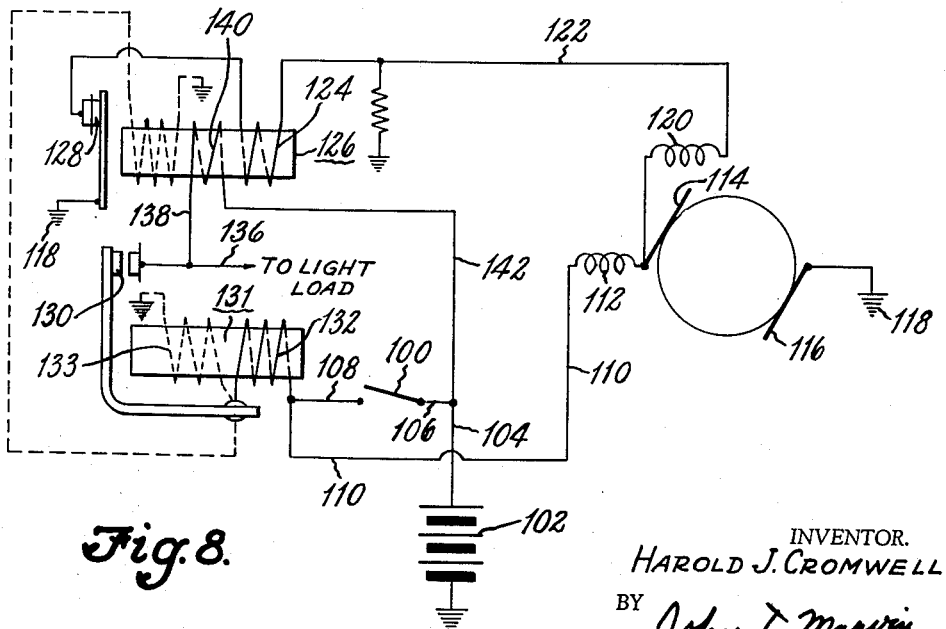
FIGURE 8 shows a typical wiring diagram for the unit in FIGURE 2.

In the FIGURE 8 of the drawings, a typical circuit for permitting the unit 20 to operate both as a motor and a generator is shown. In this drawing, when the starting switch 100 is closed, current will flow from the battery 102 through lead 104, lead 106, switch 100, lead 108, lead 110 through the series would field coil 112, the brush 114, the armature of the unit 20, not shown, the brush 116 to ground 118. The shunt wound field coil 120 is in parallel with the armature, not shown, so that a portion of the current will flow from the series field 112 through the shunt coil 120 and lead 122, through the series coil 124 of the voltage and current regulator relay 126, through the normally closed contacts 128 to ground 118 from whence it is returned to the grounded terminal of the battery 102. During the period switch 100 is closed, the contacts 130 of the cut-out relay 131 will remain in their normally open position as the current flow in the coils 132 and 133 will be insufficient to cause the closing of the contacts 130.

After the engine has become self-operative, the switch 100 is released to break the aforementioned circuit. The dynamoelectric unit will then act as a generator and current will flow from the brush 114 through the series coil 112, the lead 110, the series coil 132 and shunt coil 133 of the cut-out relay 131 to cause the closing of contacts 130 to complete the circuit to lead 136 and 138. The lead 136 may be connected to a suitable external load such as lights or other current consuming devices. The current in lead 138 flows through the series coil 140 of the voltage and current regulator 126 through lead 142 and lead 104 to provide the charging current for the battery 102. The voltage and current regulator relay 126 and the cut-out relay 131 are of standard types as are well known to those skilled in the art. The fields 120 and 112 are wound so that when the unit 20 is operating as a motor, the shunt field 120 will aid the series field 112 to increase the torque output of the unit. When, however, the unit 20 is operating as a generator, the current in the series field 112 is in the opposite direction and the flux from the series field opposes that from shunt field 120. This will provide a degree of voltage and current regulation for the unit 20.

While the present invention may be used on any size engine, it is particularly adapted for use on small engines. It is to be appreciated that, if the same unit is to be used for both cranking the engine and charging the battery, it is desired to have different pulley ratios between the unit and engine for cranking purposes than when the unit is used as a generator. Therefore, when the above arrangement is employed and the pulley consists of at least one movable half which is movable with respect to a second pulley half, if the units are arranged so that the pulley halves will separate in cranking and will move together during the time periods when the unit is operating as a generator, a very efficient system of cranking an engine with a combination motor-generator will be realized.

While the forms of embodiment of the present invention as herein disclosed constitute preferred forms, it is to be understood that other forms might be adopted.

What is claimed is as follows:

1. A cranking and current generating system for use with an internal combustion engage, comprising in combination; a dynamoelectric unit having an output shaft, said unit being constructed and arranged to rotate said shaft as a driving member when the unit acts as a starting motor for the engine and to act as a current generator when the shaft is rotatively driven by said engine, a threaded portion on said shaft, a V-groove pulley half secured to said shaft, a second pulley half cooperable with the secured pulley half to define a V-groove, said second pulley half being threadedly received on the threaded portion of said shaft, a pulley drivingly connected to said engine, a belt connecting the engine driven pulley with both halves of the pulley on the shaft, the second pulley half being arranged on the threaded portion of said shaft and cooperating with said belt to move toward said secured pulley half when the engine is driving said shaft, and to separate from said secured pulley half when the unit acts as a motor, and a pivotal mounting for the unit arranged so the reactive torque generated within unit aids in tightening the belt and the separation of the second pulley half from the first pulley half when the unit is operating as a motor.

2. The combination as set forth in claim 1 wherein the movement of the second pulley half to and from the secured pulley half is limited to a predetermined distance.

3. In a cranking and generating system for an internal combustion engine, the combination comprising; a dynamoelectric unit rotatable in the same direction to operate either as a starting motor or a current generator, a pulley connected with the engine for rotation therewith in either direction of rotation of said engine, a two-speed variable diameter pulley connected with the unit, a belt operatively connecting the engine pulley with the two-speed pulley, means responsive to the speed of said pulley for causing said pulley to have a smaller diameter when the unit is acting as a starting motor then when the unit is being rotated by the engine as a generator after the engine is self-operative, and a pivotal mounting for the unit arranged to tighten the belt by armature reaction of the unit when the unit is acting as a starting motor.

4. A cranking and current generating system for use with an internal combustion engine, comprising; a dynamoelectric unit having an output shaft, said unit being adapted to rotate said shaft as a driving member when the unit is acting as a motor and to act as a current generator when the shaft is rotated as a driven member, a pulley drivingly connected to the engine shaft for rotation therewith in either direction of rotation of said engine, V-shaped pulley means, a belt connecting the engine pulley with the V-shaped pulley means, said V-shaped pulley means being connected to the shaft and comprising a pair of pulley halves arranged to axially separate when the shaft is rotating as a driving member and to axially assemble when the shaft is rotated as a driven member in response to the speed of movement of said belt, and a pivotal mounting for the unit arranged so that the reactive torque generated within the unit, when said unit is operating as a motor, aids in tightening the belt.

5. A variable diameter pulley device adapted for use with a dynamoelectric machine and the like comprising, a shaft having a threaded portion, a first pulley half rigidly secured to said shaft for rotation therewith, a second pulley half having a threaded engagement with said threaded portion of the shaft, said pulley halves forming a V-shaped groove that is adapted to receive a belt, first stop means carried by said shaft for limiting movement of said second pulley in a direction away from said first pulley half, and second stop means for preventing said second pulley half from moving into binding engagement with said first pulley half.

6. A variable diameter pulley adapted to automatically vary its diameter in response to the speed of movement of a belt comprising, a shaft having a threaded portion, a first pulley half connected for rotation with said shaft, a second pulley half threadingly engaging the threaded portion of said shaft, said pulley halves forming a V-shaped groove for receiving said belt, and first and second spaced stop means including pins passing through said shaft for limiting the movement of said second pulley half in two directions.

7. A variable diameter pulley structure adapted to vary its diameter in accordance with the speed of movement of a belt which it engages comprising, a shaft having an integral threaded portion, a first pulley half connected to rotate with said shaft, a second pulley half having a threaded engagement with the threaded portion of said shaft, said pulley halves forming a V-shaped groove which is adapted to receive said belt, and a pair of spaced stop means carried by said shaft for limiting the movement of said second pulley half in two directions, one of said stop means being positioned to prevent binding engagement between said pulley halves.

8. A variable diameter pulley adapted to vary its diameter automatically in response to the speed of movement of a belt which it carries comprising, a shaft having a threaded portion, a first pulley half secured to said shaft for rotation therewith, a second pulley half threadingly engaging the threaded portion of said shaft and axially movable therealong, said pulley halves forming a V-shaped groove adapted to receive said belt, first and second stop means carried by said shaft for limiting movement of said second pulley half in two directions, said stop means including first and second pins, one of which projects beyond the outer diameter of the threaded portion and the other of which is below the outer diameter of the threaded portion.

References Cited in the file of this patent

UNITED STATES PATENTS

| | | | |
|---|---|---|---|
| 707,936 | Northrop | Aug. 26, | 1902 |
| 1,196,927 | Brush | Sept. 5, | 1916 |
| 1,201,387 | Tattersall | Oct. 17, | 1916 |
| 1,231,639 | Nickonow | July 3, | 1917 |
| 1,634,285 | Garver | July 5, | 1927 |
| 1,882,022 | Leyvastre | Oct. 11, | 1932 |
| 2,478,289 | Lemon | Aug. 9, | 1949 |
| 2,666,331 | Hewson | Jan. 19, | 1954 |
| 2,742,793 | Askren et al. | Apr. 24, | 1956 |
| 2,782,649 | Shortland | Feb. 26, | 1957 |
| 2,897,677 | Wood | Aug. 4, | 1959 |

FOREIGN PATENTS

| | | | |
|---|---|---|---|
| 2,746 | Great Britain | Feb. 2, | 1912 |
| 547,876 | France | Oct. 5, | 1922 |
| 884,070 | France | Apr. 12, | 1943 |